United States Patent [19]

Plyler

[11] Patent Number: 4,678,146
[45] Date of Patent: Jul. 7, 1987

[54] UNIVERSAL GROMMET RETAINER

[75] Inventor: Robert G. Plyler, Vienna, Ohio

[73] Assignee: General Motors Corporation, Detroit, Mich.

[21] Appl. No.: 804,619

[22] Filed: Dec. 5, 1985

[51] Int. Cl.$^4$ .............................................. F16L 5/00
[52] U.S. Cl. .................................. 248/56; 174/65 G; 174/153 G
[58] Field of Search ................. 248/56, 57, 27.1, 27.3; 285/158; 16/2

[56] References Cited

U.S. PATENT DOCUMENTS

| | | | |
|---|---|---|---|
| 2,365,785 | 12/1944 | Tinnerman | 248/56 |
| 3,751,579 | 8/1973 | Nojiri | 248/56 X |
| 4,002,822 | 1/1977 | Kurosaki | 248/56 X |
| 4,234,218 | 11/1980 | Rogers | 248/56 X |
| 4,289,924 | 9/1981 | Pearce | 248/56 X |
| 4,407,042 | 10/1983 | Schramme et al. | 248/56 X |

Primary Examiner—Ramon O. Ramirez
Attorney, Agent, or Firm—Patrick M. Griffin

[57] ABSTRACT

A universal grommet retainer is structurally independent of, but acts in cooperation with, a grommet body of the type having a wire bundle held fast with respect thereto. A gripper member of the retainer, separate from the grommet body, is clamped to the wire bundle after the wire bundle is passed through an aperture in a bulkhead panel. Biasing members slideably received in tracks on the gripper member are then pressed against a surface of the bulkhead panel, thereby drawing a stop flange of the grommet body tightly against an opposed surface of the bulkhead panel. A ratchet means maintains the biasing members in place, and the grommet body is thereby attached to the bulkhead panel.

3 Claims, 4 Drawing Figures

UNIVERSAL GROMMET RETAINER

This invention relates to grommet assemblies in general, and specifically to a universal retainer for use with a grommet body of the type that has a wire bundle extending therethrough and held fast with respect thereto.

BACKGROUND OF THE INVENTION

In the automotive industry, wire bundles must often be passed through apertures in a bulkhead panel of a vehicle as it is being wired. A grommet assembly is desirable to support the wire bundle and protect it from the sharp edges of the aperture. As electronic components have increased in number and complexity, it has become necessary to protect and support much larger and heavier wire bundles. Consequently, the trend is toward grommet assemblies, often known as hardshell grommet assemblies, that are larger and capable of handling and accurately locating the larger wire bundles. These hardshell grommet assemblies generally include a grommet body with a passage through which the wire bundle extends. Often, these hardshell grommet assemblies also provide for injecting a sealant material into the passage around the wire bundle. This sealant, sometimes in conjunction with wire clips inside the passage, holds the wire bundle fast with respect to the grommet body. Some means is necessary to attach the grommet body to the bulkhead panel overlying the aperture as the vehicle is being wired. Various means for doing so are disclosed in patents assigned to the assignee of the present invention. U.S. Pat. No. 4,289,924 to Pearce et al. shows a hardshell grommet assembly 10 that is attached to a bulkhead panel 14 overlying an aperture 12 by bolts or other fasteners that pass through holes in the bulkhead panel 14. A grommet assembly that requires no fasteners passing through the bulkhead panel is disclosed in U.S. Pat. No. 4,407,042 to Schramme et al. There, a grommet assembly 10 has a shank 38 that is inserted through the bulkhead panel aperture. Then, a U-shaped retainer 22 is pushed in from the side into tapered slots 54 in the shank 38 to attach and retain the grommet assembly 10. Both of these attachment methods work well, and have been extensively used. However, both require that some part of the structure of the grommet body itself be directly used to attach the grommet body. A retainer for a grommet body that was structurally independent of the grommet body, and which could, therefore, be universally used with any grommet body of the type described, would be desirable.

SUMMARY OF THE INVENTION

The subject invention provides such a retainer for attaching a grommet body to a bulkhead panel having opposed surfaces with an aperture therethrough. The retainer of the invention is used with a grommet body of the type that has a stop portion and a wire bundle extending through, and held fast with respect to, the grommet body. The retainer attaches the grommet body to the bulkhead panel after the grommet body has been placed in an attachment position with the stop portion engaged with one surface of the bulkhead panel and with the wire bundle passing through the aperture. The retainer is structurally independent of, but is adapted to act in cooperation with, the grommet body. Thus, the retainer may be universally used with any grommet body of that general type.

The retainer of the invention includes a gripper member separate from the grommet body. The gripper member is adapted to be clamped around the wire bundle at a location spaced from the other surface of the bulkhead panel. In addition, the gripper member includes an adjustable means that allows it to be so clamped around wire bundles of varying sizes.

The gripper member has a pair of slotted tracks, each of which receives one of a pair of struts that act as biasing members. Each strut is slideably movable in its track relative to the gripper member after the gripper member has been clamped to the wire bundle. The end of each strut has a resilient foot that acts as a contact portion to engage and be compressed against the other surface of the bulkhead panel as the biasing member moves toward the other bulkhead panel surface. The sides of the struts include a series of ratchet teeth that snap past the edges of the slotted tracks as the struts are moved, thereby acting as a one-way ratchet means to allow the struts to move relative to the gripper member only toward the bulkhead panel.

Once the grommet body has been placed in the attachment position described above, the gripper member is clamped around the wire bundle. A pressing force is then applied to the struts to slide them through their tracks relative to the gripper member. This moves the resilient feet toward the bulkhead panel, where they are compressed. The one-way ratchet means continuously maintains the compression of the resilient feet as the struts move. As the resilient feet are compressed, the gripper member is biased away from the bulkhead panel. In turn, the clamped gripper member pulls on the wire bundle. Since the wire bundle is held fast with respect to the grommet body, the net effect is that the grommet body stop portion is drawn toward and into tighter engagement with the one bulkhead panel surface. When the pressing force is removed from the struts, the ratchet means acts as a latch means to prevent the the compressed feet of the struts from moving away from the other bulkhead panel surface. The grommet body stop portion and the feet of the struts are thereby maintained in engagement with their respective bulkhead panel surfaces, and the grommet body is thereby attached to the bulkhead panel.

It is, therefore, an object of the invention to provide a universal retainer for use with a grommet body of the type having a stop portion and a wire bundle extending through the grommet body and held fast with respect thereto to attach the grommet body to an apertured panel having opposed surfaces when the grommet body has been placed in an attachment position with the stop portion engaged with one surface of the panel and with the wire bundle passing through the aperture, in which the retainer includes a gripper member structurally independent from the grommet body and adapted to be clamped around the wire bundle at a location spaced from the other surface of the panel, and further includes at least one biasing member that is slideably movable relative to the gripper member when the gripper member is clamped to the wire bundle, the biasing member further having a contact portion that is engageable with the other panel surface as the biasing member moves relative to the clamped gripper member toward the other panel surface, and in which there is also a latch means operative between the biasing member and the gripper member to prevent the contact portion from moving away from the other panel surface, so that, when the biasing member is moved relative to the clamped gripper member toward the panel other surface, the biasing member contact portion engages the panel other surface, thereby biasing the clamped gripper member away from the panel other surface and pulling on the wire bundle to draw the grommet body stop portion into tighter engagement with the panel one surface, the grommet body stop portion and the biasing member contact portion being maintained in engagement with their respective panel surfaces by the latch means to thereby attach the grommet body to the panel.

It is another object of the invention to provide a universal retainer of the type described in which the contact portion of the biasing member is resilient and is compressed against the the other panel surface as the biasing member is moved and in which there is also a ratchet means operative between the biasing member and the gripper member to allow the biasing member to move relative to the clamped gripper member only toward the panel other surface, thereby continuously maintaining the compression of the resilient contact portion, the ratchet means also maintaining the grommet body stop portion and the compressed contact portion in engagement with their respective panel surfaces to thereby attach the grommet body to the panel.

It is yet another object of the invention to provide a universal retainer of the type described in which the gripper member also includes an adjustable means to allow it to be clamped around wire bundles of varying size.

DESCRIPTION OF THE PREFERRED EMBODIMENT

These and other objects and features of the invention will appear from the following written description and the drawings, in which.

Figure 1:
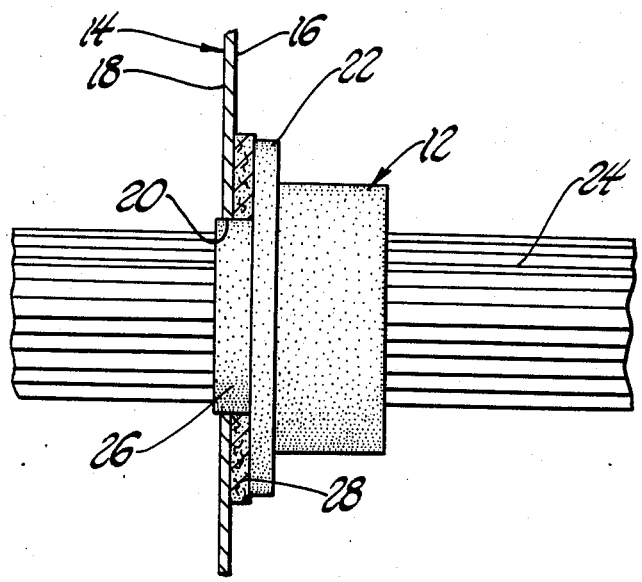
FIG. 1 is a view showing an apertured bulkhead panel in cross section with a wire bundle and grommet body in attachment position.
Figure 4:
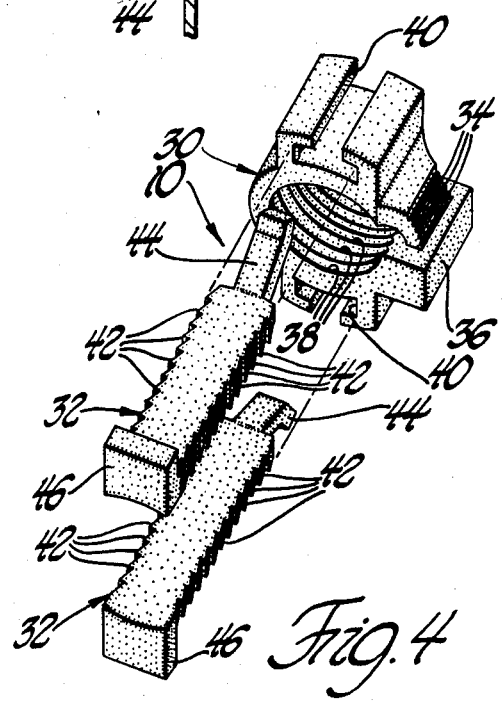
FIG. 4 is a perspective view of the preferred embodiment of the retainer of the invention with the biasing members removed from the gripper member so as to better illustrate the details.

Referring first to FIGS. 1 and 4, the preferred embodiment of the universal retainer of the invention is designated generally at 10. The retainer 10 is structurally independent of a grommet body, designated generally at 12, but cooperates with the grommet body 12 to attach it to a bulkhead panel, designated generally at 14. Bulkhead panel 14 is formed of generally planar sheet metal, and has opposed surfaces 16 and 18 with a circular aperture 20 therethrough. The grommet body 12 is molded of plastic or other suitable material, and has a stop portion, which is a circular stop flange 22 with a diameter larger than aperture 20. Grommet body 12 also includes a wire bundle 24 that extends through it and which is also held fast with respect to grommet body 12. Wire bundles like 24 are generally substantially cylindrical, and formed of a plurality of insulated wires. The wire bundle 24 may be held fast to grommet body 12 by clips, by clips in conjunction with an injected sealant, or any suitable means, the details of which are conventional. It is not necessary that the wire bundle 24 be a plurality of wires. A single larger wire, or a sheathed cable of smaller wires would also work. It is helpful, however, if the wire bundle 24 has an exterior surface that is easily gripped, as will appear below.

Referring now to FIG. 1, the grommet body 12 also includes a cylindrical boss 26, which helps to position it and protects the wire bundle 24 from the edge of the aperture 20. The stop flange 22 is also backed by an annular gasket 28. As shown in FIG. 1, grommet body 12 is in what may be termed an attachment position. In the attachment position, the locating boss 26 is fitted through aperture 20, wire bundle 24 passes through aperture 20, and the stop flange 22, through the intermediate gasket 28, is engaged with bulkhead panel surface 16. What is most significant to the invention in the broadest sense is that the wire bundle 24 is held fast, and that the stop flange 22 is engageable with the bulkhead panel surface 16. The retainer 10 may be universally used with any grommet body of that general type.

Figure 2:
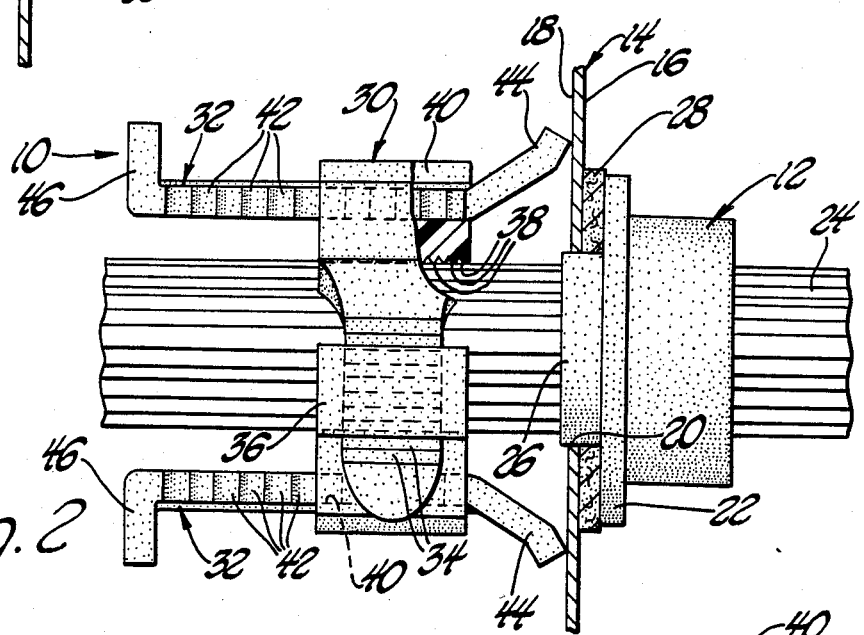
FIG. 2 is a view similar to FIG. 1, but with the preferred embodiment of the retainer of the invention in place prior to the biasing members being moved.

Referring now to FIGS. 2 and 4, the retainer 10 includes three basic structural parts, a gripper member, designated generally at 30, and a pair of struts designated generally at 32. The gripper member 30 is separate from the grommet body 12, and is generally in the form of a strap molded from flexible plastic or other suitable material. The two ends of the gripper member 30 includes a series of serrations 34 and a slotted keeper 36, respectively. The inside of gripper member 30 includes a series of ribs 38. Gripper member 30 may thus be clamped firmly around wire bundle 24, as shown in FIG. 2, with the ribs 38 grabbing the insulation of the outer wires of the wire bundle 24. The serrations 34 snap fit within the keeper 36, thereby providing an adjustable means to allow the gripper member 30 to be clamped around wire bundles 24 of varying diameters. An adhesive could be used, if desired, to strengthen the clamping of gripper member 30 to wire bundle 24, as it is important that the gripper member 30 not move, or move only very slightly, relative to wire bundle 24 during the attachment process.

Still referring to FIGS. 2 and 4, the gripper member 30 also has a pair of slotted tracks 40, each of which slideably receives a strut 32. Each strut 32 has a series of ratchet teeth 42 on its sides, and a resilient foot 44, which is the portion of the strut 32 that contacts the bulkhead panel surface 18. The end of each strut is bent up at 46 to provide a thumb rest. Each strut 32 would be inserted into its respective track 40 first. Then, with the grommet body 12 in its attachment position, the gripper member 30 would be clamped to wire bundle 24, spaced from bulkhead panel surface 18, as seen in FIG. 2. As shown, the foot 44 of each strut 32 is just touching the bulkhead panel surface 18. That is not absolutely necessary, but is convenient, since it helps to maintain the grommet body 12 against falling out of its attachment position prior to the final step in the attachment process.

Figure 3:
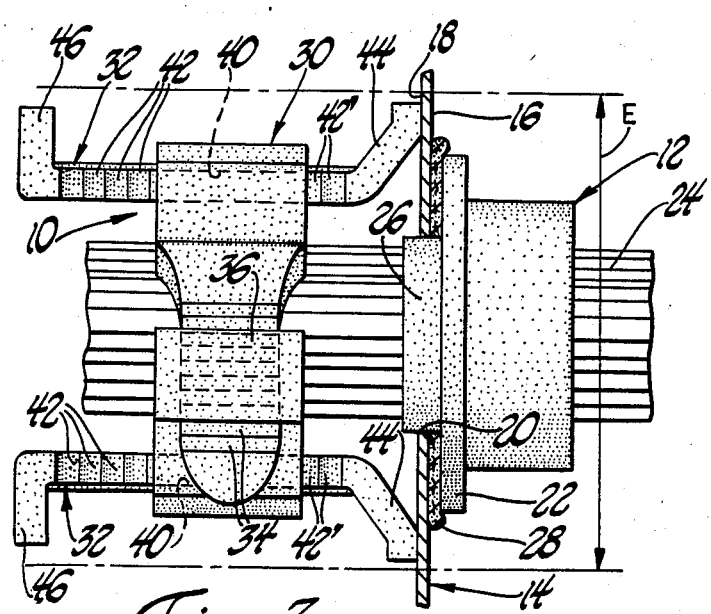
FIG. 3 is a view similar to FIG. 3, but with the biasing members in their final position.

Referring now to FIGS. 2, 3 and 4, once the gripper member 30 is clamped in place, each strut 32 is slideably moved in its track 40 relative to the gripper member 30 and toward the bulkhead panel surface 18. This may be done by hand by hooking a finger or fingers behind the gripper member 30, and applying a pressing force to the thumb rest 46. As the struts 32 slide, the ratchet teeth 42 snap past the edges of the slotted tracks 40. A one-way ratchet means is thereby provided that allows the struts 32 to be moved relative to the gripper member 30 with relatively little pressing force, but only toward surface 18. As the struts 32 so move, the resilient feet 44 are compressed against the bulkhead panel surface 18, and the compression is continuously maintained by the ratchet means. The compression of the resilient feet 44 may be varied by sliding the struts a greater or lesser amount relative to the gripper member 30, within the increments allowed by the fineness of the ratchet teeth 42. As the feet 44 compress, the struts 32 act as biasing members and push the gripper member 30 away from the bulkhead panel surface 18 with a force proportional to the compression. The clamped gripper member 30, in turn, pulls out on the wire bundle 24. The pulling on wire bundle 24 occurs because the gripper member 30 is clamped to it, so it is important that there be no, or only very slight, slippage. Since the wire bundle 24 is held fast with respect to the grommet body 12, the net effect is that the grommet body stop flange 22 is drawn toward the bulkhead panel surface 16, compressing the gasket 28, as seen in FIG. 3. When the pressing force on the struts 32 is removed, the ratchet means acts as a latch means to prevent the the compressed feet 44 from moving away from the bulkhead panel surface 18. Consequently, the grommet body stop flange 22 is maintained in engagement with the bulkhead panel surface 16, through the intermediate compressed gasket 28. The grommet body 12 is, thereby, attached to the bulkhead panel 14.

Other advantages of the invention appear from FIG. 3. Because of the compact size of gripper member 30 and the sliding arrangement of the struts 32, the entire retainer 10 fits within a minimal envelope of space around the wire bundle 24, designated E. The compressed gasket 28 provides a seal between the grommet body 12 and the aperture 20. Furthermore, the gasket 28 and the resilient feet 44 cooperate to give a resiliently attached retainer 10 and grommet body 12 assembly. At the FIG. 3 position, pulling the wire bundle 24 to the left will compress gasket 28 more, and allow the feet 44 to expand, while pulling the wire bundle 24 to the right will compress the feet 44 more, and allow the gasket 28 to expand.

Variations of the preferred embodiment may be made within the spirit of the invention. A different means of clamping the gripper member 30 could be used, nor need it be adjustable, if the wire bundle 24 is of a standard size. However, the adjustability is a definite advantage. The feet 44 that contact the bulkhead panel surface 18 needn't be resilient just to effect an attachment, but the ability to adjust the biasing force that the resiliency gives, plus the resiliency in the attachment, are advantageous. Similar considerations apply to the gasket 28. Its presence is not absolutely necessary to effect an attachment, but a seal is practically desirable, and it cooperates in making the attachment resilient. It is important that the struts 32 be somehow maintained against sliding back from their final position to maintain the engagement of feet 44 with bulkhead panel surface 18. It would be possible to provide struts 32 that inherently latched themselves, as with a very tight sliding fit, for example, thus eliminating the need for a latch means that was a separate structure. However, it is desirable as a practical matter that the struts 32 slide more easily than that. The ratchet means conveniently provides that one-way sliding. An entire series of ratchet teeth 42 is also not absolutely necessary in the broadest sense. Only those ratchet teeth 42 that last snap through the tracks 40, numbered 42' in FIG. 3, are needed to latch the struts 32 at their final position. However, providing a series of teeth 42 allows the compression of the feet 44 to be varied and continuously maintained, as noted, and also provides some leeway in the location of the gripper member 30 relative to the bulkhead panel surface 18. Therefore, it will be understood that the invention is capable of being embodied in structures other than that disclosed, and is not intended to be so limited.

The embodiments of the invention in which an exclusive property or privilege is claimed are defined as follows:

1. A grommet assembly attachable to a panel having opposed surfaces to pass a wire bundle through an aperture in said panel, said grommet assembly comprising, a grommet body adapted to hold said wire bundle fast as it extends through said grommet body, and also including a stop portion engageable with one surface of said panel when said grommet body has been placed in an attachment position with said wire bundle passing through said aperture, a universal retainer, said retainer including a gripper member structurally separate from said grommet body and adapted to be clamped around said wire bundle at a location spaced from the other surface of said panel, said retainer further including at least one biasing member slideably movable relative to said gripper member when said gripper member is clamped to said wire bundle, said biasing member having a contact portion engageable with said panel other surface as said biasing member moves relative to said clamped gripper member toward said panel other surface, and latch means operative between said biasing member and said gripper member to prevent said contact portion from moving away from said panel other surface when said contact member has engaged said panel other surface, whereby, when said biasing member is moved relative to said clamped gripper member toward said panel other surface, said biasing member contact portion engages said panel other surface, thereby biasing said clamped gripper member away from said panel other surface and pulling on said wire bundle to draw said grommet body stop portion into tighter engagement with said panel one surface, said grommet body stop portion and said biasing member contact portion being maintained in engagement with their respective panel surfaces by said latch means, said structurally independent universal retainer thereby cooperating with said grommet body to attach said grommet assembly to said panel.

2. A grommet assembly attachable to a panel having opposed surfaces to pass a wire bundle through an aperture in said panel, said grommet assembly comprising, a grommet body adapted to hold said wire bundle fast as it extends through said grommet body, and also including a stop portion engageable with one surface of said panel when said grommet body has been placed in an attachment position with said wire bundle passing through said aperture, a universal retainer, said retainer including a gripper member structurally separate from said grommet body and adapted to be clamped around said wire bundle at a location spaced from the other surface of said panel, said retainer further including at least one biasing member slideably movable relative to said gripper member when said gripper member is clamped to said wire bundle, said biasing member having a resilient contact portion that is compressible against said panel other surface as said biasing member moves relative to said clamped gripper member toward said panel other surface, and a ratchet means operative between said biasing member and said gripper member to allow said biasing member to move relative to said clamped gripper member only toward said panel other surface, whereby, when said biasing member is moved relative to said clamped gripper member toward said panel other surface, said biasing member resilient contact portion is compressed against said panel other surface and continuously maintained in compression by said ratchet means, thereby biasing said clamped gripper member away from said panel other surface and pulling on said wire bundle to draw said grommet body stop portion into tighter engagement with said panel one surface, said grommet body stop portion and said compressed biasing member contact portion being maintained in engagement with their respective panel surfaces by said ratchet means, said structurally independent universal retainer thereby cooperating with said grommet body to attach said grommet assembly to said panel.

3. A grommet assembly attachable to a panel having opposed surfaces to pass a wire bundle through an aperture in said panel, said grommet assembly comprising, a grommet body adapted to hold said wire bundle fast as it extends through said grommet body, and also including a stop portion engageble with one surface of said panel when said grommet body has been placed in an attachment position with said wire bundle passing through said aperture, a universal retainer, said retainer including a gripper member structurally separate from said grommet body and adapted to be clamped around said wire bundle at a location spaced from the other surface of said panel, said gripper member also including adjustable means to allow it to be clamped around wire bundles of varying size, said retainer further including at least one biasing member slideably movable relative to said gripper member when said gripper member is clamped to said wire bundle, said biasing member having a resilient contact portion that is compressible against said panel other surface as said biasing member moves relative to said clamped gripper member toward said panel other surface, and a ratchet means operative between said biasing member and said gripper member to allow said biasing member to move relative to said clamped gripper member only toward said panel other surface, whereby, when said biasing member is moved relative to said clamped gripper member toward said panel other surface, said biasing member resilient contact portion is compressed against said panel other surface and continuously maintained in compression by said ratchet means, thereby biasing said clamped gripper member away from said panel other surface and pulling on said wire bundle to draw said grommet body stop portion into tighter engagement with said panel one surface, said grommet body stop portion and said compressed biasing member contact portion being maintained in engagement with their respective panel surfaces by said ratchet means, said structurally independent universal retainer thereby cooperating with said grommet body to attach said grommet assembly to side panel.

* * * * *